(12) United States Patent
Wang et al.

(10) Patent No.: US 12,485,388 B2
(45) Date of Patent: Dec. 2, 2025

(54) COMPOSITE MEMBRANE AND METHOD OF MAKING THE SAME

(71) Applicant: Nanyang Technological University, Singapore (SG)

(72) Inventors: Rong Wang, Singapore (SG); Qing Li, Singapore (SG); Ye Li, Singapore (SG); Yunfeng Chen, Singapore (SG); Yining Wang, Singapore (SG); Lizhi Zhang, Singapore (SG)

(73) Assignee: H2MO TECHNOLOGY PTE LTD, Singapore (SG)

( * ) Notice: Subject to any disclaimer, the term of this patent is extended or adjusted under 35 U.S.C. 154(b) by 517 days.

(21) Appl. No.: 17/915,533

(22) PCT Filed: Apr. 1, 2021

(86) PCT No.: PCT/SG2021/050185
§ 371 (c)(1),
(2) Date: Sep. 29, 2022

(87) PCT Pub. No.: WO2021/201783
PCT Pub. Date: Oct. 7, 2021

(65) Prior Publication Data
US 2023/0132994 A1    May 4, 2023

(30) Foreign Application Priority Data
Apr. 2, 2020    (SG) .......................... 10202003091Q (51) Int. Cl.
*B01D 69/12*  (2006.01)
*B01D 67/00*  (2006.01)
*B01D 71/56*  (2006.01)

(52) U.S. Cl.
CPC ..... *B01D 69/1251* (2022.08); *B01D 67/0006* (2013.01); *B01D 71/56* (2013.01);
(Continued)

(58) Field of Classification Search
CPC .......................... B01D 69/02; B01D 69/1251; B01D 2323/40; B01D 2325/39
See application file for complete search history.

(56) References Cited

U.S. PATENT DOCUMENTS

2011/0084026 A1    4/2011  Freger et al.
2014/0332468 A1   11/2014  Tang et al.
(Continued)

FOREIGN PATENT DOCUMENTS

CN    108176241 A    6/2018
JP    S6397168 A     4/1988
(Continued)

OTHER PUBLICATIONS

Xu, Jian, et al. "The morphology of fully-aromatic polyamide separation layer and its relationship with separation performance of TFC membranes." Journal of Membrane Science 541 (2017): 174-188. (Year: 2017).*

(Continued)

*Primary Examiner* — Bradley R Spies
(74) *Attorney, Agent, or Firm* — Tyler Sisk; Casimir Jones SC (57) ABSTRACT

The present invention relates to a method for producing a composite membrane, the method comprising impregnating a surface of a porous membrane substrate with an aqueous suspension comprising a mixture of at least one polyamine and at least one phospholipid; and contacting the impregnated surface with an organic phase containing a monomer to thereby deposit a polyamide layer on the impregnated surface. The present invention also relates to a composite membrane comprising at least one porous membrane substrate having nano-sized or micro-sized pores; and at least a polyamide layer disposed on a surface of the porous membrane substrate, the polyamide layer comprising at least one phospholipid dispersed therein, and wherein the polyamide layer is an interfacial polymerization product.

13 Claims, 5 Drawing Sheets

(52) U.S. Cl.
CPC ...... *B01D 2323/12* (2013.01); *B01D 2323/30* (2013.01); *B01D 2323/40* (2013.01); *B01D 2323/46* (2013.01)

(56) References Cited

U.S. PATENT DOCUMENTS

| | | | |
|---|---|---|---|
| 2015/0144553 A1 | 5/2015 | Vogel et al. | |
| 2018/0236409 A1 | 8/2018 | Fujii et al. | |

FOREIGN PATENT DOCUMENTS

| | | | |
|---|---|---|---|
| JP | 2014100645 A | 6/2014 | |
| JP | 2019171360 A | 10/2019 | |
| WO | 2019187870 A1 | 10/2019 | |

OTHER PUBLICATIONS

European Patent Office, Extended European Search Report for EP Application No. 21779917.0 mailed Feb. 22, 2024.

Liang, Z. et al., Performance evaluation of interfacial polymerisation-fabricated aquaporin-based biomimetic membranes in forward osmosis. RSC Advances, Apr. 5, 2019, vol. 9, No. 19, pp. 10715-10726.

Li, X. et al., Nature gives the best solution for desalination: Aquaporin-based hollow fiber composite membrane with superior performance. Journal of Membrane Science, Jul. 26, 2015, vol. 494, pp. 68-77.

Qi, S. et al., Aquaporin-based biomimetic reverse osmosis membranes: Stability and long term performance. Journal of Membrane Science, Feb. 18, 2016, vol. 508, pp. 94-103.

China National Intellectual Property Administration, Office Action for Application No. 202180001613.5 mailed Feb. 21, 2023.

\* cited by examiner

COMPOSITE MEMBRANE AND METHOD OF MAKING THE SAME

PRIORITY CLAIM

The present application is a national stage application of PCT/SG2021/050185 filed on 1 Apr. 2021, which claims priority to Singapore Application No. 10202003091Q filed on 2 Apr. 2020, the contents of which are hereby incorporated by reference in their entirety of all purposes.

TECHNICAL FIELD

The present invention relates to membranes for water filtration. In particular, it relates to composite membranes and methods of making thereof.

BACKGROUND

Membrane technology is an integral part of a variety of industrial and commercial processes, including but not limited to, water recovery, seawater desalination, water purification, food processing, manufacturing processes in pharmaceutical industries, and medical applications. An important application of membrane technology is in the generation of clean or potable water. The provision of potable water typically involves the use of reverse osmosis (RO) and/or nano-filtration (NF) membranes. Particularly in the field of water purification/treatment, it is generally preferred to employ membranes with high permeability for a number of benefits. For instance, the use of highly permeable membranes may lead to lower capital cost (e.g., because less membrane area is required for any desired level of permeate output), which in turns leads to other advantages such as, saving space due to the membrane equipment having a smaller footprint), or reducing energy consumption since the membranes are capable of operating at lower pressure conditions.

A common challenge faced by RO and NF membranes is the requirement to balance the need for having increased permeability of water molecules, while maintaining an acceptable rejection rate of solutes and/or ions.

To address this challenge, most thin film composite (TFC) RO and/or NF membranes possess a selective layer with enhanced membrane water permeability deposited on a surface of the membrane substrate. Such selective layers may comprise nanoparticles/water channel compounds. In one example, biomimetic TFC membranes comprise protein-based, water-selective channels such as aquaporins (AQP). The presence of aquaporins was observed to lead to increased hydrophilicity of the membrane while maintaining a stable level of salt rejection. However, there are significant barriers to the upscaling or commercialization of such membranes. For instance, the production of biological proteins is a non-trivial endeavor involving protein expression by a host organism, which is a challenging process to control. Subsequently, a cascade of protein purification steps may be required in order to obtain the desired protein before incorporation into the membrane, leading to relatively higher costs of production compared to other types of RO/FO membranes Nanocomposite membranes have also been extensively studied at the laboratory scale for use in the water treatment industry. Such membranes typically involve the incorporation of nanomaterials in the membrane in order to modify the physiochemical properties of the membrane, e.g., hydrophilicity, porosity, charge density, durability, etc. For example, carbon nanotubes have been embedded in polymeric membranes in the preparation of mixed matrix membranes for use in water purification processes. However, such nanocomposite membranes also require complicated fabrication processes and face difficulties when in operation, which may discourage the use of such membranes. Typical difficulties encountered in the fabrication or operation of such nanocomposite membranes include, for instance, poor dispersibility of the nanomaterials in the polymeric matrix, aggregation of nanoparticles causing defects on the membrane surface, and potential leakage of the nanomaterials causing toxicity and/or contamination of the treated water.

Accordingly, there is a need to provide an alternative method of preparing a membrane intended for use in water treatment or purification, which ameliorates or avoids the problems described above. Yet another objective of the present disclosure is to provide a novel membrane prepared from the method disclosed herein, and which is substantially free of biological proteins such as aquaporins.

SUMMARY

In one aspect of the disclosure, there is provided a method of preparing a composite membrane, the method comprising: a) impregnating a surface of a porous membrane substrate with an aqueous suspension comprising a mixture of at least one polyamine and at least one phospholipid; b) contacting the impregnated surface with an organic phase containing a monomer comprising at least one crosslinking group to thereby deposit a polyamide layer on the impregnated surface, wherein the polyamide layer comprises the phospholipid dispersed therein, and wherein the polyamide layer is an interfacial polymerization product.

In another aspect of the present invention, there is provided a composite membrane comprising: at least one porous membrane substrate having nano-sized or micro-sized pores, and at least a polyamide layer disposed on a surface of the porous membrane substrate, the polyamide layer comprising phospholipids dispersed therein, and wherein the polyamide layer is an interfacial polymerization product.

Advantageously, it was observed that the incorporation of phospholipids into the polyamide layer resulted in unexpected and material improvements to the membrane selectivity, while not compromising its capability to reject solutes and impurities (e.g., salts) in the water being treated. In particular, it was found that a membrane prepared according to the present disclosure is able to substantially increase its permeability to water, while maintaining a salt (e.g. NaCl) rejection rate of at least 90% or greater, or preferably about 95% or greater at an applied pressure of about 2 bar.

The improvement in membrane permeability may be potentially attributed to the unique topography of the polyamide selective layer and the presence of lipids. In one embodiment, the formation of leaf-like structures or leaf-like features was observed on the polyamide layer formed from an aromatic polyamine and an aromatic crosslinker in the presence of a phospholipid. These leaf-like structures may be characterized as blade-like protrusions extending upward from the base of the polyamide layer. The base refers to the surface of the polyamide layer which is coupled to the underlying membrane substrate, which may be composed of a different polymer e.g., polyethersulfone. These protruding, leaf-like structures may typically be between 200 to 4,000 nm in height (calculated from the base of the polyamide layer). It is postulated that the presence of these surface structures on the fully aromatic polyamide layer provided increased surface area for contact with water molecules, thereby facilitating the transport of water through the membrane.

Furthermore, the polyamide layer formed in the presence of a phospholipid may also result in the formation of large interstitial spaces which help focus the transport of water molecules toward and across the underlying membrane substrate. Such effects may be observed for semi-aromatic polyamide layers having a height of less than 100 nm, formed with an aliphatic polyamide and an aromatic monomer having at least one crosslinking group in the presence of a phospholipid.

In some embodiments of the present invention, it was demonstrated that a membrane comprising the phospholipid-embedded polyamide layer was capable of achieving water permeability 6-8 times greater than a comparative membrane where the lipids are absent in the selective polyamide layer. Further advantageously, it was found that the membranes according to the present invention were able to achieve similar permeability/rejection performance when compared with currently available aquaporin-containing membranes, while being comparatively easier and low-cost to produce.

Definitions

The following words and terms used herein shall have the meaning indicated:

The term "crosslinker" as used herein is to be interpreted broadly to refer to any compound or monomer having functional groups with crosslinking ability. This includes monomers which may be used to link polymer chains via covalent bonds to form a polymer network. The crosslinker may comprise reactive functional groups which form covalent bonds to link one or more monomers. The crosslinker itself may be incorporated into the polymer network. In the context of the present invention, a monomer having functional groups with crosslinking ability or a monomer having at least one crosslinking group may be termed as a "crosslinker".

The term "monomer" as used herein may refer to a compound which may react chemically with other molecules which may or may not be of the same type, to form a larger molecule. Monomers may comprise functional groups capable of forming covalent linkages and reacting with other molecules.

The term "polymer" as used herein may refer to compounds which comprise multiple repeating units of a monomer. Polymers may comprise an infinite number of repeating units of a monomer.

The term "aliphatic" as used herein may refer to hydrocarbons compounds, groups or radicals which are non-aromatic. These may include saturated or unsaturated hydrocarbons having single, double or triple carbon-carbon bonds. Aliphatic compounds may also include straight-chained, branched or cyclic compounds.

The term "acyl" as used herein may refer to a radical of the general formula —C(O)R, where R is an alkyl, cycloalkyl, aryl, heterocycloalkyl or heteroaryl group. Accordingly, the term "acyl halide" refers to a compound having the general formula RC(O)X, where R is an alkyl, cycloalkyl, aryl, heterocycloalkyl or heteroaryl group, and X is a halide atom, e.g F, Cl, Br, or I.

The term "sulfonyl" as used herein may refer to the —SO$_2$— biradical. Accordingly, the term "sulfonyl halide" may refer to the functional group of the formula —SO$_2$X, where X is a halide atom, e.g. F, Cl, Br, or I.

The term "semi-aromatic", as used herein to describe the polyamide layer, or a "semi-aromatic polyamide layer" may refer to a polyamide layer formed using at least one aromatic monomer and at least one non-aromatic monomer. For instance, a semi aromatic polyamide layer may be formed using an aliphatic polyamine and an aromatic crosslinker; or an aromatic polyamine and an aliphatic crosslinker.

The term "fully-aromatic", as used herein to describe the polyamide layer, or a "fully aromatic polyamide layer" may refer to a polyamide network formed from aromatic monomers. For example, a fully aromatic polyamide layer may be formed from an aromatic crosslinker and an aromatic polyamine.

As used herein, the terms "apparent height", "height", "thickness" or grammatical variants thereof used to describe the polyamide layer may refer to the distance between the base of the polyamide layer and the peak of any structures or features disposed thereon.

As used herein, the term "alkyl group" may include within its meaning monovalent ("alkyl") and divalent ("alkylene") straight chain or branched chain saturated aliphatic groups having particularly, but not limited to, at least one carbon atom, or a C1-50 alkyl, a C1-40 alkyl, a C1-30 alkyl or any number of carbon atoms falling within these ranges. For example, a C1-12 alkyl includes, but is not limited to, methyl, ethyl, 1-propyl, isopropyl, 1-butyl, 2-butyl, isobutyl, tert-butyl, amyl, 1,2-dimethylpropyl, 1,1-dimethylpropyl, pentyl, isopentyl, hexyl, 4-methylpentyl, 1-methylpentyl, 2-methylpentyl, 3-methylpentyl, 2,2-dimethylbutyl, 3,3-dimethylbutyl, 1,2-dimethylbutyl, 1,3-dimethylbutyl, 1,2,2-trimethylpropyl, 1,1,2-trimethylpropyl, 2-ethylpentyl, 3-ethylpentyl, heptyl, 1-methylhexyl, 2,2-dimethylpentyl, 3,3-dimethylpentyl, 4,4-dimethylpentyl, 1,2-dimethylpentyl, 1,3-dimethylpentyl, 1,4-dimethylpentyl, 1,2,3-trimethylbutyl, 1,1,2-trimethylbutyl, 1,1,3-trimethylbutyl, 5-methylheptyl, 1-methylheptyl, octyl, nonyl, decyl, dodecyl and the like. The group may be a terminal group or a bridging group.

"Alkenyl" as a group or part of a group may denote an aliphatic hydrocarbon group containing at least one carbon-carbon double bond and which may be straight or branched having but not limited to, at least 2 carbon atoms, 2-50 carbon atoms, 2-25 carbon atoms, 12-24 carbon atoms, or any number of carbons falling within these ranges, in the normal chain. The group may contain a plurality of double bonds in the normal chain and the orientation about each is independently E, Z, cis or trans where applicable. Exemplary alkenyl groups include, but are not limited to, ethenyl, propenyl, butenyl, pentenyl, hexenyl, heptenyl, octenyl and nonenyl. The group may be a terminal group or a bridging group.

The term "aromatic group", or variants thereof such as "aryl" or "arylene" as used herein may refer to monovalent ("aryl") and divalent ("arylene") single, polynuclear, conjugated and fused residues of aromatic hydrocarbons having from 6 to 10 carbon atoms. Examples of such groups include phenyl, biphenyl, naphthyl, phenanthrenyl, and the like.

The word "substantially" does not exclude "completely" e.g. a composition which is "substantially free" from Y may be completely free from Y. Where necessary, the word "substantially" may be omitted from the definition of the invention.

Unless specified otherwise, the terms "comprising" and "comprise", and grammatical variants thereof, are intended to represent "open" or "inclusive" language such that they include recited elements but also permit inclusion of additional, unrecited elements.

As used herein, the term "about", in the context of concentrations of components of the formulations, typically means +/−5% of the stated value, more typically +/−4% of the stated value, more typically +/−3% of the stated value, more typically, +/−2% of the stated value, even more typically +/−1% of the stated value, and even more typically +/−0.5% of the stated value.

Throughout this disclosure, certain embodiments may be disclosed in a range format. It should be understood that the description in range format is merely for convenience and brevity and should not be construed as an inflexible limitation on the scope of the disclosed ranges. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Certain embodiments may also be described broadly and generically herein. Each of the narrower species and sub-generic groupings falling within the generic disclosure also form part of the disclosure. This includes the generic description of the embodiments with a proviso or negative limitation removing any subject matter from the genus, regardless of whether or not the excised material is specifically recited herein.

BRIEF DESCRIPTION OF DRAWINGS

The accompanying figures, where like reference numerals refer to identical or functionally similar elements throughout the separate views and which together with the detailed description below are incorporated in and form part of the specification, serve to illustrate various embodiments and to explain various principles and advantages in accordance with a present embodiment.

Skilled artisans will appreciate that elements in the figures are illustrated for simplicity and clarity and have not necessarily been depicted to scale. For example, the dimensions of some of the elements in the illustrations, block diagrams or flowcharts may be exaggerated in respect to other elements to help to improve understanding of the present embodiments.

DETAILED DESCRIPTION OF EMBODIMENTS

The following detailed description is merely exemplary in nature and is not intended to limit the invention or the application and uses of the invention. Furthermore, there is no intention to be bound by any theory presented in the preceding background of the invention or the following detailed description.

There is herein provided a method of preparing a composite membrane, the method comprising:
  a) impregnating a surface of a porous membrane substrate with an aqueous suspension comprising a mixture of at least one polyamine and at least one phospholipid;
  b) contacting the impregnated surface with an organic phase containing a monomer comprising at least one crosslinking group (i.e. a monomer comprising functional groups with crosslinking ability) to thereby deposit a polyamide layer on the impregnated surface, wherein the polyamide layer comprises at least one phospholipid dispersed therein, and wherein the polyamide layer is an interfacial polymerization product.

The step of impregnating the surface of porous membrane substrate may be carried out by exposing the surface of the porous membrane substrate to the aqueous suspension comprising a mixture of at least one polyamine and at least one phospholipid. The aqueous suspension may be contacted with the surface or lumen surface of the porous membrane substrate to impregnate the surface of the porous membrane substrate. A pressure gradient may be optionally applied during the contacting step. Alternatively, the aqueous suspension may be sprayed or poured over the surface of the membrane. The membrane may also be immersed in the aqueous suspension to impregnate the surface of the porous membrane substrate.

In embodiments, when a hollow fiber composite membrane is to be prepared, the aqueous suspension is flowed or passed through the lumen of hollow fiber composite membrane to impregnate the surface of the lumen. Where a flat sheet membrane is prepared from the disclosed method, the aqueous suspension was poured over the surface of the flat sheet membrane. Alternatively, the aqueous suspension may be immersed and sprayed over the surface of the flat sheet membrane.

The porous membrane substrate used in the method described herein may comprise nano-sized or micro-sized pores. The porous membrane substrate may be made from organic or inorganic materials, which may be synthetic or naturally available. Inorganic porous membranes including zeolites and ceramic membranes such as aluminum oxide, silicon carbide, titanium dioxide and zirconium dioxide may be also be used as the substrate for the method described herein.

In embodiments, the membrane substrate is preferably a synthetic organic porous substrate. Such membranes may be prepared using spinning or casting methods known in the art. During preparation of the porous membrane substrates, additives may be used at a concentration sufficient to adjust the porosity and/or hydrophilicity of the final membrane substrate. Non-limiting examples of membrane materials which may be used herein include polyethersulfone (PES), polyetherimide (PEI), polysulfone (PSF), polyacrylonitrile (PAN), polyvinylidene difluoride (PVDF), poly(tetrafluoroethylene) (PTFE), polyethylene (PE), polypropylene (PP), polyimide (PI) or co-polymers thereof. The porous membrane substrate may preferably comprise polyethersulfone (PES), polyetherimide (PEI), polysulfone (PSF), polyacrylonitrile (PAN), polyvinylidene difluoride (PVDF) or co-polymers thereof. In embodiments, the porous membrane substrate is made from polyetherimide (PEI) or polyethersulfone (PES).

Impregnation of the surface of a porous membrane substrate may be carried out using an aqueous suspension comprising at least one polyamine and at least one phospholipid. The aqueous suspension may be substantially devoid of transmembrane proteins or analogues thereof. In particular, the aqueous suspension may be substantially devoid of aquaporins and the resultant polyamide layer deposited on the surface of the porous membrane surface may also be substantially devoid of aquaporins.

Advantageously, composite membranes prepared according to the methods disclosed herein demonstrated good water permeability and increased solute rejection, even in the absence of transmembrane proteins such as aquaporins. In embodiments, water permeability of up to about 6 LMH/bar and sodium chloride rejection of about 94-96% at 2 bar transmembrane pressure was observed for exemplary membrane modules with an active area of 5000 cm$^2$ or 32000 cm$^2$. The performance of the composite membranes disclosed herein is comparable to aquaporin-based membranes having a similar active area. This is believed to be due to the presence of the phospholipids which facilitates interfacial polymerization, and allows the deposition of a polyamide layer with increased effective membrane area or increased interstitial distance between the polyamide layer and the surface of the substrate. Thus, the water permeability of the membrane is also increased, even without dependency on the quality of biomolecules such as aquaporins. The fabrication and quality of the composite membrane therefore may be regulated and controlled during industrial production.

The polyamine may be added at a concentration of about from about 0.001 wt. % to about 10 wt. %, based on the weight of the aqueous suspension. The aqueous suspension may comprise the polyamine at a concentration of from about 0.001 wt. % to about 10 wt. %; or from about 0.005 wt. % to about 10 wt. %; or from about 0.01 wt. % to about 10 wt. %; or from about 0.05 wt. % to about 10 wt. %; or from about 0.1 wt. % to about 10 wt. %; or from about 0.1 wt. % to about 9 wt. %; or from about 0.1 wt. % to about 8 wt. %; or from about 0.1 wt. % to about 7 wt. %; or from about 0.1 wt. % to about 6 wt. %; or from about 0.1 wt. % to about 5 wt. %; or from about 0.1 wt. % to about 4.5 wt. %; or from about 0.1 wt. % to about 4 wt. %; or from about 0.15 wt. % to about 4 wt. %; or from about 0.2 wt. % to about 4 wt. %; or from about 0.25 wt. % to about 3.5 wt. %; or preferably from about 0.5 wt. % to about 3 wt. %, based on the weight of the aqueous suspension. In embodiments, the polyamine is provided at a concentration of about 1.2 wt. %, based on the weight of the aqueous suspension.

The polyamine may be a water-soluble polyamine. The polyamine may comprise at least two amine groups. The polyamine may comprise 2 to 100 amine groups, or 2 to 90 amine groups, or 2 to 80 amine groups, or 2 to 70 amine groups, or 2 to 60 amine groups, or 2 to 50 amine groups, or 2 to 40 amine groups, or 2 to 30 amine groups, or 2 to 20 amine groups, or 2 to 18 amine groups, or 2 to 16 amine groups, or 2 to 14 amine groups, or 2 to 12 amine groups, or 2 to 10 amine groups, or 2 to 9 amine groups, or 2 to 8 amine groups, or 2 to 7 amine groups, or 2 to 6 amine groups, or 2 to 5 amine groups, or preferably 2 to 4 amine groups. In embodiments, the polyamine comprises 2 amine groups.

The amine groups in the polyamine may be independently, primary amine groups or secondary amine groups. In embodiments, the polyamine may be a monomer comprising at least two amine groups, wherein the polyamine is a monomer comprising at least two amine groups, wherein said amine groups are independently primary or secondary amine groups. For instance, the polyamine used in the impregnation step may comprise two primary amine groups, two secondary amine groups, or one primary amine group and one secondary amine group, i.e. a mixture of primary and secondary amine groups. In embodiments, the polyamine comprises two primary amine groups.

The polyamine may comprise at least 2 carbon atoms. For example, the polyamine may comprise 2 to 500 carbon atoms; or 2 to 450 carbon atoms; or 2 to 400 carbon atoms; or 2 to 350 carbon atoms; or 2 to 300 carbon atoms; or 2 to 250 carbon atoms; or 2 to 200 carbon atoms; or 2 to 180 carbon atoms; or 2 to 160 carbon atoms; or 2 to 140 carbon atoms; or 2 to 120 carbon atoms; or 2 to 100 carbon atoms; or 2 to 90 carbon atoms; or 2 to 80 carbon atoms; or 2 to 70 carbon atoms; or 2 to 60 carbon atoms; or 2 to 50 carbon atoms; or 2 to 40 carbon atoms; or 2 to 30 carbon atoms; or 2 to 20 carbon atoms; or 2 to 10 carbon atoms; preferably 4 to 10 carbon atoms. In some embodiments, the polyamine comprises 6 carbon atoms. In other embodiments, the polyamine comprises 4 carbon atoms The polyamine may be an aliphatic, aromatic or heterocyclic polyamine. Aliphatic polyamines which may be used in the method disclosed herein may comprise alkyl, alkenyl, cycloalkyl, alkynyl groups. The polyamine may preferably by an aromatic polyamine or a heterocyclic polyamine. As demonstrated in the Examples, the polymerization of an aromatic polyamine with an aromatic crosslinker may advantageously lead to the formation of leaf-like structures as disclosed herein, which in turn improves the water permeability of the membrane.

The polyamine may be selected from the group consisting of m-phenylenediamine (MPD), m-phenylenediamine-4-methyl, 1,3-cyclohexanebis(methylamine), o-phenylenediamine (OPD), piperazine, p-phenylenediamine (PPD), 1,1'-biphenyl-4,4'-diamine (benzidine), polyethyleneimine, cyclohexane-1,2-diamine, 3,3',5,5'-tetramethylbenzidine, N,N'-diphenylbenzidine, 1,4-diaminonaphthalene, 1,5-diaminonaphthalene, benzene-1,2,4-triamine, 1,4-diaminocyclohexane, 1,2,4,5-Benzenetetramine, 1,8-Diaminonaphthalene, 9,10-Diaminophenanthrene, N-Methyl-1,2- phenylenediamine, 2,5-Dimethyl-1,4-phenylenediamine, 2-methyl-1,3-benzenediamine, N,N-Dimethyl-1,2-phenylenediamine, [4-(aminomethyl)cyclohexyl]methylamine, 2-Aminomethyl-cyclohexylamine and mixtures thereof.

Preferred polyamines for the method disclosed herein include m-phenylenediamine (MPD), m-phenylenediamine-4-methyl, 1,3-cyclohexanebis(methylamine), o-phenylenediamine (OPD), piperazine, p-phenylenediamine (PPD), 1,1'-biphenyl-4,4'-diamine (benzidine), polyethyleneimine and mixtures thereof. In one embodiment, the aqueous suspension comprises m-phenylenediamine. In another embodiment, piperazine was used as the polyamine in the aqueous suspension.

The aqueous suspension for impregnating the surface of the porous membrane substrate may also comprise at least one phospholipid.

The concentration of the phospholipid may be in the range of about 10 µM to about 10 mM in the aqueous phase, or about 10 µM to about 9.5 mM, or about 10 µM to about 9.0 mM, or about 10 µM to about 8.5 mM, or about 10 µM to about 8.0 mM, or about 10 µM to about 7.5 mM, or about 10 µM to about 7.0 mM, or about 10 µM to about 6.5 mM, or about 10 µM to about 6.0 mM, or about 10 µM to about 5.5 mM, or about 10 µM to about 5.0 mM, or about 20 µM to about 4.5 mM, or about 30 µM to about 4.5 mM, or about 40 µM to about 4.5 mM, preferably about 50 µM to about 4.0 mM.

It was advantageously found that water permeability of the composite membrane prepared according to the methods described herein may be optimized by providing an aqueous suspension comprising at least one phospholipid at concentrations of about 50 µM to about 4.0 mM. In embodiments, the water permeability coefficient of membranes comprising the phospholipid, 1,2-dioleoyl-sn-glycero-3-phosphocholine (DOPC), increases by at least about 60%, or preferably at least about 80%, as compared to membranes which do not comprise DOPC. It is believed that the use of a phospholipid to facilitate the interfacial polymerization reaction results in polyamide layers with increased effective membrane area, thereby increasing the water permeability of the composite membrane. The dispersion of the phospholipid within the deposited polyamide layer is believed to contribute to an increase in the interstitial space between the polyamide layer and the substrate, which facilitates the transport of water across the membrane.

Natural or synthetic phospholipids or mixtures thereof may be used for the preparation of the composite membrane described herein. These include naturally-occurring phospholipids obtained from eggs, E. coli lipid extracts, soy lipid extracts, yeast lipid extracts and mixtures thereof; and synthetic phospholipids such as phosphatidylcholines, phosphatidylserines, phosphatidylglycerols, phophatidylethanolamines or mixtures thereof. In embodiments, natural phosphatidylcholines were used for the preparation of the thin film composite. In one embodiment, the porous membrane substrate was impregnated with a suspension of egg phosphatidylcholine (PC).

The phospholipid suspended in the aqueous phase may comprise acyl groups having saturated and/or unsaturated carbon chains.

The phospholipid may be of formula (I) below:

(Formula I)

wherein $R_1$ and $R_2$, may be, independently, saturated or unsaturated aliphatic groups having 10 to 50 carbon atoms; and wherein $R_3$ is:

The saturated or unsaturated aliphatic groups $R_1$ and $R_2$ may independently comprise 10 to 50 carbon atoms, or 10 to 45 carbon atoms, or 10 to 40 carbon atoms, or 10 to 35 carbon atoms, or 10 to 30 carbon atoms, or 10 to 28 carbon atoms, or 10 to 26 carbon atoms, or 12 to 26 carbons, preferably 12 to 24 carbon atoms.

Substituent $R_1$ may preferably be a saturated or an unsaturated aliphatic group having 14 to 24 carbon atoms; while the substituent $R_2$ may preferably be a saturated or unsaturated aliphatic group having 14 to 24 carbon atoms. In one embodiment, $R_1$ and $R_2$ are both unsaturated aliphatic groups having 17 carbon atoms. In another embodiment, $R_1$ is a saturated aliphatic group having 15 carbon atoms, while $R_2$ is an unsaturated aliphatic group having 17 carbon atoms.

Phospholipids which may be used for the method described herein may be selected from the group consisting of 1,2-dioleoyl-sn-glycero-3-phosphocholine (DOPC), 1,2-dioleoyl-sn-glycero-3-phosphoethanolamine (DOPE), 1,2-dioleoyl-sn-glycero-3-phospho-rac-(1-glycerol) (DOPG), L-α-phosphatidylcholine (egg PC), 1,2-ditetradecanoyl-sn-glycero-3-phosphocholine (DMPC), 2-oleoyl-1-palmitoyl-sn-glycero-3-phosphocholine (POPC), 1,2-dilauroyl-sn-glycero-3-phosphocholine (DLPC), 1,2-dimyristoyl-sn-glycero-3-phosphocholine (DMPC), 1,2-dipalmitoyl-sn-glycero-3-phosphocholine (DPPC), 1,2-distearoyl-sn-glycero-3-phosphocholine (DSPC), 1,2-dilauroyl-sn-glycero-3-phospho-(1'-rac-glycerol) (sodium salt) (DLPG), 1,2-dimyristoyl-sn-glycero-3-phospho-(1'-rac-glycerol) (sodium salt) (DMPG), 1,2-dipalmitoyl-sn-glycero-3-phospho-(1'-rac-glycerol) (sodium salt) (DPPG), 1-palmitoyl-2-oleoyl-sn-glycero-3-phospho-(1'-rac-glycerol) (sodium salt) (POPG), 1,2-dimyristoyl-sn-glycero-3-phospho-L-serine (sodium salt) (DMPS), 1,2-dipalmitoyl-sn-glycero-3-phospho-L-serine (sodium salt) (DPPS), 1,2-distearoyl-sn-glycero-3-phospho-L-serine (sodium salt) (DSPS), 1,2-dioleoyl-sn-glycero-3-phospho-L-serine (sodium salt) (DOPS), 1-palmitoyl-2-oleoyl-sn-glycero-3-phospho-L-serine (sodium salt) (POPS), 1,2-dilauroyl-sn-glycero-3-phosphate (sodium salt) (DLPA), 1,2-dimyristoyl-sn-glycero-3-phosphate (sodium salt) (DMPA), 1,2-dipalmitoyl-sn-glycero-3-phosphate (sodium salt) (DPPA), 1,2-distearoyl-sn-glycero-3-phosphate (sodium salt) (DSPA), 1-palmitoyl-2-oleoyl-sn-glycero-3-phosphate (sodium salt) (POPA), 1,2-dilauroyl-sn-glycero-3-phosphoethanolamine (DLPE), 1,2-dimyristoyl-sn-glycero-3-phosphoethanolamine (DMPE), 1,2-dipalmitoyl-sn-glycero-3-phosphoethanolamine (DPPE), 1,2-distearoyl-sn-glycero-3-phosphoethanolamine (DSPE), 1-palmitoyl-2-oleoyl-sn-glycero-3-phosphoethanolamine (POPE), 1,2-di-O-octadecenyl-3-trimethylammonium propane (chloride salt) (DOTMA), *E. coli* lipid extract, soy lipid extract, yeast lipid extract, 1-palmitoyl-2-(dipyrrometheneboron difluoride)undecanoyl-sn-glycero-3-phosphocholine, 1,2-dioleoyl-sn-glycero-3-phospho-(1'-myo-inositol) (ammonium salt) (DOPI), 1-palmitoyl-2-oleoyl-sn-glycero-3-phosphoinositol (ammonium salt) (POPI), 1,2-dipalmitoyl-sn-glycero-3-phospho-(1'-myo-inositol) (ammonium salt) (DPPI), 1,1',2,2'-tetraoleoyl cardiolipin (TOOL), 1,2-dioleoyl-sn-glycero-3-phosphoethanol (DO-PEt), 1,2-dioleoyl-sn-glycero-3-phosphoethanol (DOPEt) (18:0 diethyl PC), or combinations thereof.

The phospholipid may preferably be selected from the group consisting of: 1,2-Dioleoyl-sn-glycero-3-phosphocholine (DOPC), 1,2-Dioleoyl-sn-glycero-3-phosphoethanolamine (DOPE), 1,2-Dioleoyl-snglycero-3-phospho-rac-(1-glycerol) (DOPG), L-α-phosphatidylcholine (egg PC), 1,2-ditetradecanoyl-sn-glycero-3-phosphocholine (DMPC), 2-Oleoyl-1-palmitoyl-sn-glycero-3-phosphocholine (POPC), and mixtures thereof. In one embodiment, the phospholipid is 1,2-Dioleoyl-sn-glycero-3-phosphocholine (DOPC). In another embodiment, the phospholipid is 2-ditetradecanoyl-sn-glycero-3-phosphocholine (DMPC).

After impregnating step a), excess aqueous suspension may be removed from the surface of the porous membrane substrate. Excess aqueous suspension may be removed by rinsing, gas purging or blowing prior to the contacting step b). Gas or compressed air may be used to purge or blow off the excess aqueous suspension from the surface of the impregnated porous membrane substrate.

Alternatively, removal of the excess aqueous suspension may also be carried out by rinsing the surface of the impregnated porous membrane substrate with an organic solvent. The organic solvent for rinsing may be a non-polar organic solvent. The organic solvent used for rinsing may be the same solvent used for the organic phase in contacting step b). Non-limiting examples of organic solvents which may be used to rinse the surface of the impregnated porous membrane substrate include cyclohexane, hexane, pentane, toluene, diethyl ether, ethyl acetate chloroform or dichloromethane. In embodiments, cyclohexane was used to rinse the surface of the porous membrane substrate before contacting the impregnated membrane substrate with an organic phase containing at least one crosslinker.

The impregnated membrane substrate may subsequently be contacted with an organic phase containing a monomer comprising at least one crosslinking group (i.e. a crosslinker) to deposit a polyamide layer on the impregnated surface of the porous membrane substrate.

The organic phase used in contacting step b) may be immiscible with the aqueous suspension of impregnating step a), to facilitate an interfacial polymerization reaction. Accordingly, the organic phase may comprise an organic solvent which is immiscible with water, but is capable of dissolving the crosslinker. The organic solvent may preferably be unreactive or inert to the monomer comprising at least one crosslinking group. The organic phase may further comprise a non-polar organic solvent. Organic solvents such as cyclohexane, hexane, pentane, toluene, diethyl ether, ethyl acetate chloroform or dichloromethane may be used in the organic phase. In embodiments, the organic phase comprises cyclohexane. The use of an organic solvent for the organic phase of step b) which is immiscible with the aqueous suspension of contacting step a) facilitates the interfacial polymerization reaction between the two immiscible phases.

The contacting step b) may be carried out for a duration sufficient to deposit a polyamide layer having a thickness of from about 500 nm to about 4,000 nm. The contacting step b) may be undertaken for a period of about 10 seconds to 10 minutes, or about 10 seconds to 9.5 minutes, or about 10 seconds to 9 minutes, or about 10 seconds to 8.5 minutes, or about 10 seconds to 8 minutes, or about 10 seconds to 7.5 minutes, or about 10 seconds to 7 minutes, or about 10 seconds to 6.5 minutes, or about 10 seconds to 6 minutes, or about 10 seconds to 5 minutes, or about 10 seconds to 4.5 minutes, or about 10 seconds to 4 minutes, or about 15 seconds to 4 minutes, or about 20 seconds to 4 minutes, or about 20 seconds to 3.5 minutes, or about 20 seconds to 3 minutes. The impregnated membrane substrate may preferably be contacted with the organic phase for about 30 seconds to 3 minutes.

The organic phase may also comprise at least one crosslinker which reacts with the polyamine. As used herein, the term "crosslinker" refers to monomers comprising at least one crosslinking functional group (i.e. monomer comprising functional groups having crosslinking ability) which may be used to covalently bind two or more molecules or monomers to form a polyamide network. The crosslinker may be incorporated into the polyamide layer deposited on the substrate.

The organic phase may comprise the crosslinker in a concentration of from about 0.00001 wt. % to 2 wt. %, or from about 0.00005 wt. % to 2 wt. %, or from about 0.0001 wt. % to 2 wt. %, or from about 0.0002 wt. % to 2 wt. %, or from about 0.0004 wt. % to 2 wt. %, or from about 0.0006 wt. % to 2 wt. %, or from about 0.0008 wt. % to 2 wt. %, or from about 0.001 wt. % to 1.8 wt. %, or from about 0.001 wt. % to 1.6 wt. %, or from about 0.001 wt. % to 1.4 wt. %, or from about 0.001 wt. % to 1.2 wt. %, or preferably from about 0.001 wt. % to 1 wt. %, or from about 0.005 wt. % to 1 wt. %, or from about 0.01 wt. % to 1 wt. %, or from about 0.01 wt. % to 0.8 wt. %, or more preferably from about 0.05 wt. % to 0.8 wt. %, even more preferably from about 0.1 wt. % to 0.8 wt. %, based on the weight of the organic phase. In embodiments, the crosslinker is provided at a concentration of about 0.15 wt. %, based on the weight of the organic phase.

The crosslinker used in the method described herein may comprise one or more reactive functional groups capable of forming a covalent bond with the polyamine. The crosslinker may comprise at least two reactive functional groups, or 2 to 10 reactive functional groups, or 2 to 9 reactive functional groups, or 2 to 8 reactive functional groups, or 2 to 7 reactive functional groups, or 2 to 6 reactive functional groups, or 2 to 5 reactive functional groups, or preferably 2 to 4 reactive functional groups, thereby forming an extended polymer network. In embodiments, the crosslinker comprises 3 reactive functional groups.

The crosslinker may comprise acyl halide or sulfonyl halide groups, preferably at least two acyl halide or sulfonyl halide groups. In embodiments, a crosslinker having three acyl halide groups was dissolved in the organic phase.

The crosslinker selected from the group consisting of trimesoyl chloride (1,3,5-benzenetricarbonyl trichloride), terephthalic acid chloride (Terephthaloyl dichloride), isophthalic acid chloride (isophthaloyl dichloride), biphenyl dicarboxylic acid chloride, naphthalene dicarboxylic acid dichloride, biphenyl-4,4-disulfonyl chloride, 1,3,6-naphthalenetrisulfonyl chloride, phthaloyl dichloride, adipoyl chloride, oxalyl chloride, malonyl chloride and mixtures thereof. In embodiments, the crosslinker is trimesoyl chloride (1,3,5-benzenetricarbonyl trichloride).

Interfacial polymerization occurs upon contact of the organic phase comprising at least one crosslinker with the surface of the membrane which has been impregnated with an aqueous mixture of at least one polyamine and at least one phospholipid. The interfacial polymerization occurs on the surface of the porous membrane substrate, resulting in the deposition of a polyamide layer thereon. A composite membrane structure having a thin polyamide film is thereby obtained from the method described herein.

Accordingly, the present disclosure also provides a composite membrane comprising a) at least one porous membrane substrate having nano-sized or micro-sized pores, and b) at least a polyamide layer disposed on a surface of the porous membrane substrate, the polyamide layer comprising at least one phospholipid dispersed therein, and wherein the polyamide layer is an interfacial polymerization product.

In particular, the polyamide layer may be formed from the interfacial polymerization between two immiscible phases; an aqueous phase containing at least one polyamine and an organic phase containing a monomer comprising at least one crosslinking group. The aqueous phase may further comprise a suspended phospholipid, thereby allowing the dispersion of the phospholipid in the resultant polyamide layer.

The aqueous phase containing at least one polyamine and at least one suspended phospholipid may be substantially free of transmembrane proteins and its analogues. e.g. aquaporins. This results in a deposited polyamide layer which may also be substantially devoid of such proteins. Specifically, the polyamide layer formed from the interfacial polymerization reaction does not contain aquaporins.

The interfacial polymerization reaction described herein may result in the deposition of polyamide layers having a rough surface. In embodiments, the formation of ridges and valleys is observed on the surface of a deposited polyamide layer. The composite membrane may comprise a polyamide layer having a height of about 50 nm to 4000 nm; and may be a fully aromatic or a semi aromatic polyamide layer.

Surprisingly, where an aqueous phase comprising at least one phospholipid and one aromatic polyamine is used in combination with an aromatic crosslinker for the interfacial polymerization reaction, a fully aromatic polyamide layer comprising larger leaf-like features or structures is obtained. The formation of such "fully aromatic" polyamide layers result in an increase in the apparent height or thickness of the polyamide layer. Specifically, the height of the fully aromatic polyamide layer formed in the presence of the phospholipid may be in a range of about 200 nm to about 4,000 nm, from the surface of the porous membrane substrate (i.e. the base of the polyamide layer) to the peak of the polyamide layer. It is believed that the presence of the leaf-like features or structures increases the effective membrane area of the composite, thereby facilitating the passage of water molecules through the membrane. This advantageously contributes to an increased water permeability of about 60% or more for the composite membrane comprising the fully aromatic polyamide layer.

The formation of these leaf-like features and increase in thickness of the polyamide layer is believed to be due to the dispersion of the phospholipid in the aqueous phase during the interfacial polymerization reaction. As a comparison, exemplary polyamide layers having larger leaf-like structures, formed in the presence of the phospholipid demonstrate a height of 200 nm to 4000 nm and a surface roughness of 208±50 nm. This is a marked improvement over membranes formed without the phospholipid, which typically demonstrate an apparent height of about 200 nm to 1000 nm and a surface roughness of 152±66 nm.

Further, it was surprisingly found that water permeability of composite membranes comprising a semi-aromatic polyamide layer also increased as compared to membranes formed without the phospholipid. In contrast with the fully aromatic polyamide layer above, the apparent height of such semi-aromatic layers, formed from an aliphatic piperazine and an aromatic crosslinker in the presence of a phospholipid, is typically less than 100 nm. It is postulated that the increase in the permeability of such semi aromatic polyamide layers is due to an increase in the interstitial space between the polyamide layer and the surface of the substrate, which allows passage of water molecules through the membrane.

Accordingly, the composite membrane disclosed herein may have a thickness of between 200 nm to 4,000 nm when a fully aromatic polyamide layer comprising phospholipids is obtained; and a thickness of less than 100 nm when a semi aromatic polyamide layer having phospholipids dispersed therein is formed. The fully aromatic polyamide layer may comprise large leaf-like structures or features; while the semi-aromatic polyamide layer may be observed as a thin, uniform to undulating structure.

Advantageously, the presence of phospholipid facilitates the reaction between the two monomers and result in a highly crosslinked polyamide layer that contributes to a high solute rejection of about 94-97%, at low operating pressures of about 2 bar, even though water permeability of the membrane is high. In embodiments, it was demonstrated that membrane modules having an active area of 5000 $cm^2$ and 32000 $cm^2$ and a water permeability of about 6 LMH/bar maintained sodium chloride rejection at about 94-97%. The low solute passage and high water permeability of the composite membrane may also be observed from the ratio of solute permeability to water permeability (B/A ratio), which is about 5 kPa for the composite membranes described herein and 17 kPa for membranes formed without a phospholipid described herein.

When used to filter wastewater with organic contaminants, the composite membranes having advantageously maintained a high solute rejection and water permeability over a period of 120 days. In embodiments, membrane modules having active areas of 70 $cm^2$ and 300 $cm^2$ demonstrated a water flux of about 20 LMH, at an applied pressure of 2.9-3.5 bar, and a solute rejection of about 96.5% when used to filter wastewater comprising a total organic content of about 7-8 mg/L. This performance was maintained over a period of 120 days before cleaning before replacement of the membrane.

Accordingly, the present disclosure provides a method of preparing a composite membrane with a polyamide layer deposited on the surface of the porous membrane substrate. The polyamide layer may be formed from an interfacial polymerization reaction between two immiscible phases; an aqueous phase comprising a mixture of at least one polyamine and at least one phospholipid, and an organic phase comprising a crosslinker. The composite membrane described herein advantageously demonstrates low solute passage even at high water permeability.

The composite membrane described herein may be used for the fabrication of various membrane modules as operationally desired. In embodiments, hollow fiber membranes or flat sheet membranes comprising the composite membrane described herein were prepared.

EXAMPLES

Example 1

Polyetherimide (PEI) Hollow Fiber Substrates Lumen-Coated with a Polyamide Layer Comprising 1,2-Dioleoyl-sn-glycero-3-phosphocholine (DOPC)

Materials and Methods

Chemicals 1,2-dioleoyl-sn-glycero-3-phosphocholine (DOPC, 25 mg/ml, Avanti Polar Lipids, Alabama, USA) was used to prepare the aqueous mixture containing both MPD and lipid. Polyetherimide (PEI Ultem 1000, GE Plastic, USA), N-methyl-2-pyrrolidone (NMP, >99.5%, CAS #872-50-4, Merck Chemicals, Singapore) were used as the substrate materials and solvent, respectively.

Ultrapure water and tap water were used as the bore fluid and the external coagulant, respectively.

1,3,5-Benzene-tricarbonyl trichloride (TMC, CAS #4422-95-1, Sigma-Aldrich) and m-phenylenediamine (MPD, CAS #108-45-2, Sigma-Aldrich) were used as the monomers for the interfacial polymerization.

Cyclohexane (CAS #110-82-7, Merck Chemicals, Singapore) was used as the solvent for TMC.

Sodium chloride (Merck) was used in the feed solution for salt rejection tests.

Membrane Preparation

Hollow fiber PEI substrate with inner/outer diameter of 800/1000 μm was fabricated under a dry/wet spinning condition. Different numbers of fibers were assembled into modules with different sizes. For example, 5 to 30 fibers were assembled into a half-inch module. The module was then fixed vertically with an extension clamp on an iron support. The DOPC from a 20 mM stock solution was mixed with MPD solution. In the interfacial polymerization step, 1.2 wt % MPD solution containing DOPC at concentrations of about 50 μM to about 4 mM was contacted with the lumen surface of PEI fibers. Subsequently, excess MPD solution was removed by pumping fresh cyclohexane through the lumen surface. A 0.15 wt % TMC cyclohexane solution was then pumped through the lumen surface to react with the MPD residue. The as-prepared membrane module was dried in air before being soaked in ultrapure water for storage.

Membrane Performance

Water permeability and salt rejection of the membrane module were then measured. Ultrapure water was used to test membrane water permeability, whereas a 500 mg/L NaCl feed solution was used for measuring the sodium chloride rejection.

A pressure of 2 bar was applied across the membrane module, and a crossflow velocity of ~20 cm/s was maintained using a gear pump. All the measurements were carried out at room temperature (23±1° C.).

Identical conditions (i.e., 2 bar, 23±1° C.) were also applied when measuring the water permeability and salt rejection of a control membrane prepared in accordance with the method described above, except that DOPC was absent from the MPD solution.

The membrane water permeability and salt rejection performance results are shown in Table 1. It can be seen that the DOPC incorporated membrane (PEI-DOPC) has much higher water permeability (8.5±1.5 liters/m$^2$/hour/bar (LMH/bar)) compared to the control membrane (1.1±0.2 LMH/bar).

The NaCl rejection also improved from 90% to >95% upon the addition of DOPC lipids. The solute permeability to water permeability ratio (B/A) of the PEI-DOPC membrane decreased to around 5 kPa; this low value indicates a very low solute passage, despite the high water permeability of this DOPC based membrane. In contrast, it is noted that the control membrane had a corresponding ratio of 17, at least three times higher. This is an entirely unexpected result.

TABLE 1

| Membrane | Water permeability, A (LMH/bar) | NaCl rejection, R (%) | B/A (kPa) |
|---|---|---|---|
| PEI-DOPC | 8.5 ± 1.5 | 96 ± 1.5 | 5 |
| PEI-control | 1.1 ± 0.2 | 90 ± 1.0 | 17 |

Membrane Characterization

The morphology of membrane selective layer was characterized using field emission scanning electron microscope (FESEM) and atomic force microscope (AFM).

Membrane samples were freeze-dried (JSM-7600F, JEOL, Japan) and coated with a uniform layer of platinum (coating was done at 20 mV voltage and 45 s duration) prior to the FESEM imaging at 2 kV. To obtain the cross-section of the membrane, it was fractured in liquid nitrogen prior to drying. The membrane surface roughness was measured using AFM (Park XE-100, Korea). Micrographs with a scan size of 10 μm×10 μm and a resolution of 128 pixel were obtained in the non-contact Mode®.

Figure 1:
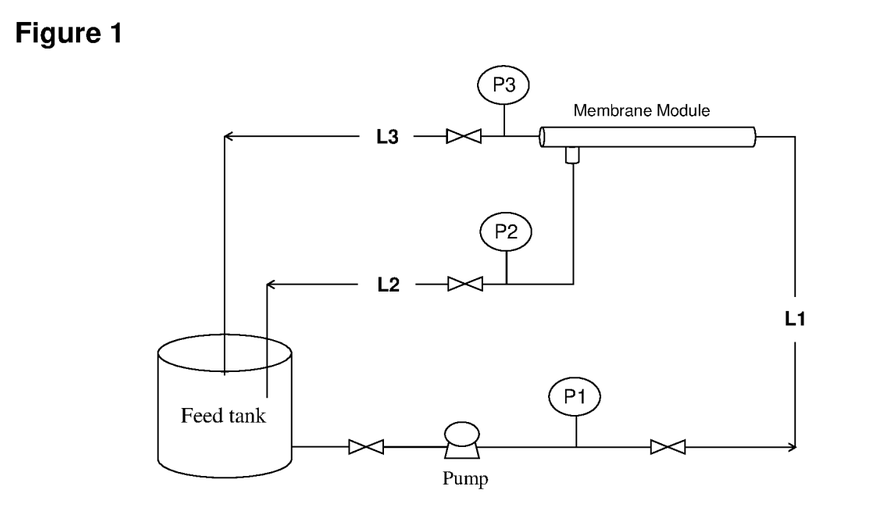
FIG. 1 is a diagrammatic illustration of an exemplary crossflow membrane filtration system comprising a membrane module/cell, a pump, a feedpipe (L1), permeate pipe (L2), a retentate pipe (L3) and pressure gauges (P1, P2 and P3).
Figure 2A:
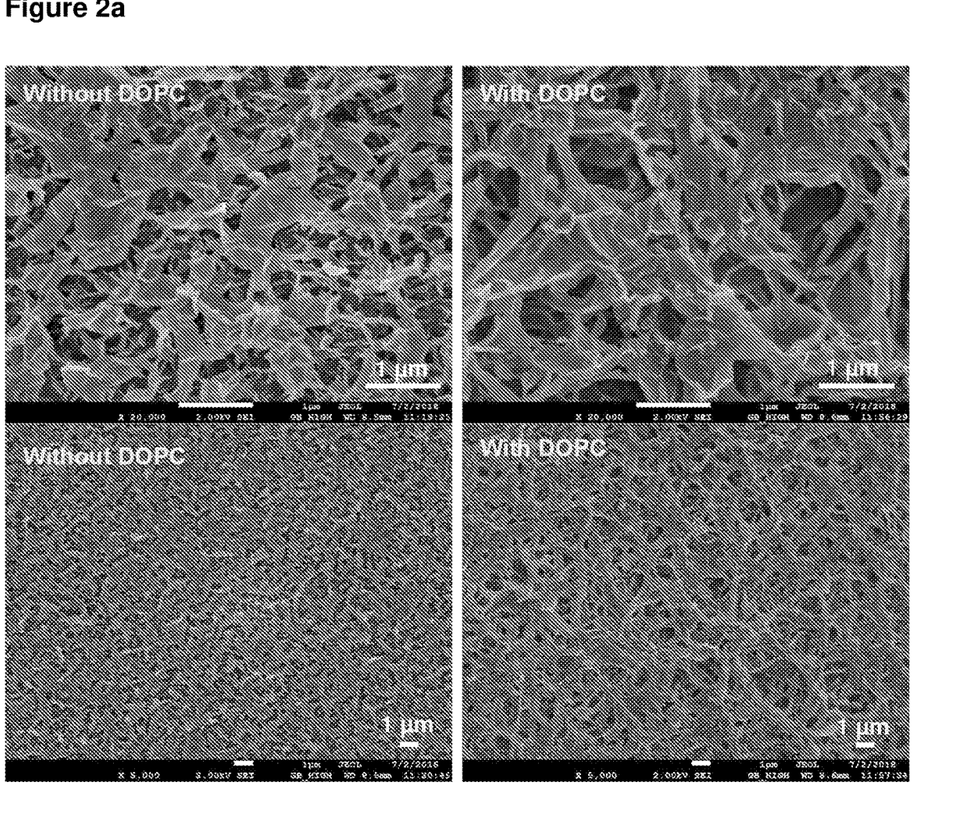
FIG. 2a illustrates scanning electron micrographs comparing the surface of a control membrane comprising a fully aromatic polyamide layer without a phospholipid (left); and the surface of the composite membrane described herein having a fully aromatic polyamide layer having formed using m-phenylenediamine (MPD) and 1,3,5-Benzene-tri-carbonyl trichloride (TMC) and having at least one phospholipid, 1,2-dioleoyl-sn-glycero-3-phosphocholine (DOPC), dispersed therein.
Figure 2B:
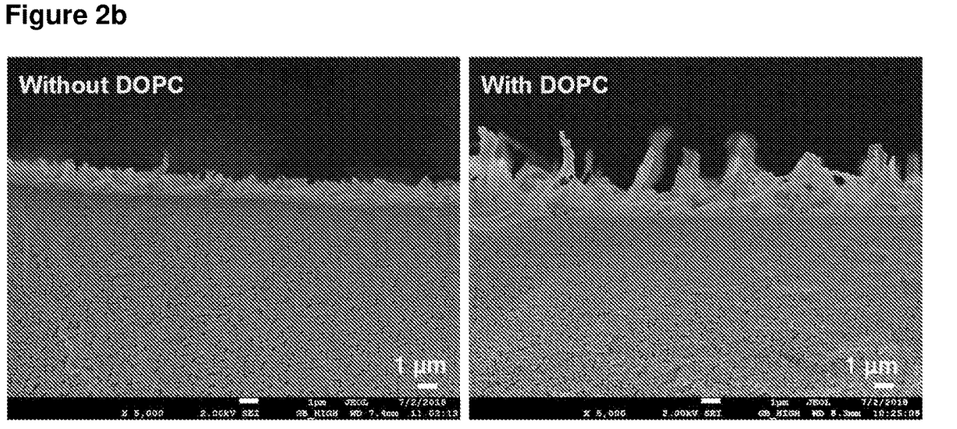
FIG. 2b depicts the scanning electron micrographs of a cross section of a fully aromatic polyamide layer formed without DOPC; and a fully aromatic polyamide layer formed using MPD and TMC, and comprising the phospholipid, DOPC, dispersed therein.

FESEM images (FIG. 2) show that the polyamide selective layer of the lipid based membrane has larger leaf-like structures, when compared with that of the control membrane (without DOPC).

Figure 3A:
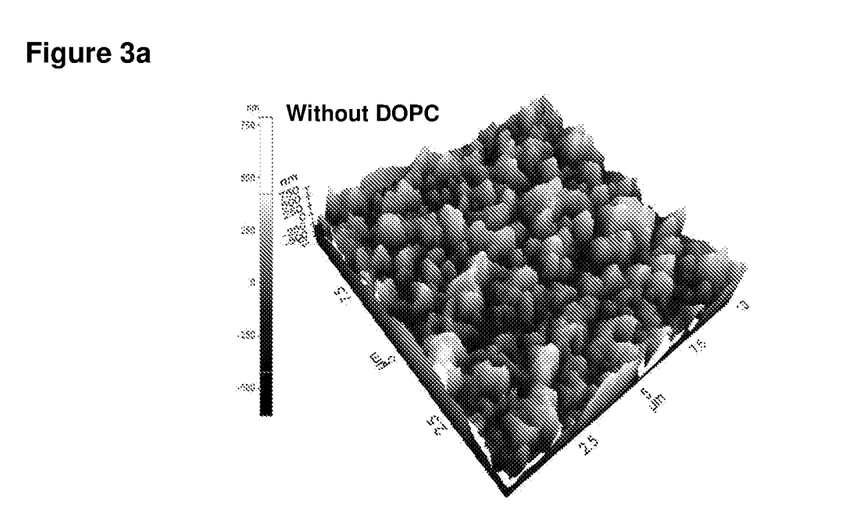
FIG. 3a is a micrograph representing the surface tomography of a control membrane comprising a polyamide layer formed without DOPC, obtained using atomic force microscopy (AFM).
Figure 3B:
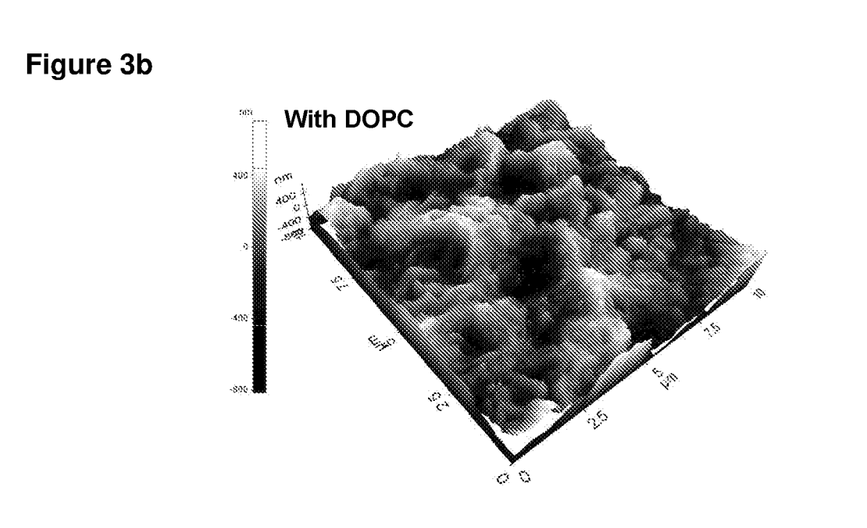
FIG. 3b is an AFM micrograph showing the surface tomography of a membrane comprising a polyamide layer having DOPC dispersed therein.

The larger leaf-like structures resulted in a significantly larger overall "thickness" of about 0.5-4 μm and which may also contribute to larger effective area for contacting the water feed. The AFM micrographs are presented in FIGS. 3a and 3b. Notably, tiny "ridge-and-valley" structures were observed for the control membrane, whereas the DOPC-incorporated membrane exhibits relatively larger surface structures having taller and/or longer ridges and with deeper and wider troughs (valleys), resulting in the appearance of leaf-like features. This result is consistent with the observation from FESEM images. Results show that the root mean square roughness is 208±50 nm and 152±66 nm for the lipid based membrane and the control membrane, respectively, which is indicative of the rougher surface of the composite membrane formed with the phospholipid. It is believed that the rougher surface and the leaf-like features of the composite membrane formed with the phospholipid contributes to a larger effective membrane area, which facilitates the transport of water through the membrane.

Scalability

Figure 4:
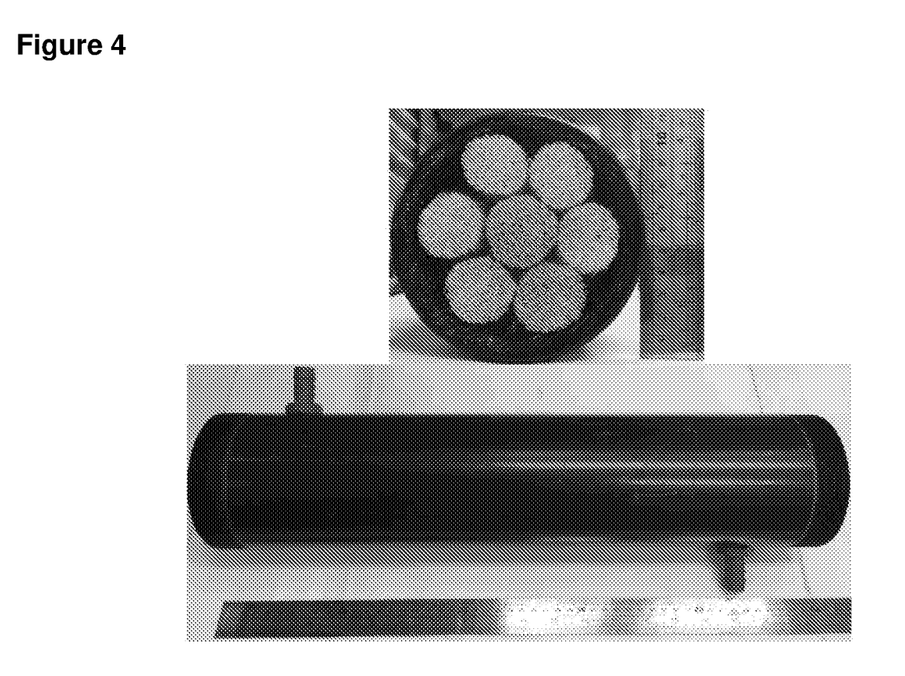
FIG. 4 depicts an exemplary 4-inch membrane module comprising 3200 fibers.

Table 2 summarizes the performance of membrane modules made with different numbers of fibers. The membrane area ranges from 26 cm$^2$ to 3.2 m$^2$ (4-inch module, see FIG. 4). It has been found that, using the membrane synthesis methods according to the present invention as described herein, a water permeability of about 8±1.5 LMH/bar can be maintained for small module (area of 300 cm$^2$), while permeabilities of up to 6 LMH/bar can still be achieved for larger modules (i.e., 2-inch and 4-inch modules).

The sodium chloride rejection is maintained at 94-96% for all the module sizes at a low applied pressure of 2 bar. With an increased operating pressure at 5 bar, a salt rejection of ≥97% can be achieved.

The performance of aquaporin based membranes was compared with the lipid-containing membranes of the present invention. The data is presented in Table 2 below.

Entries ABM_1 and ABM_2 in Table 2 refer to PEI membrane substrates which have been coated (lumen surface) with a polyamide selective layer comprising the protein Aquaporin Z (AQP-Z), a commercially available protein (UniProtKB-P60844) derived from *Escherichia coli* (strain K12). The AQP-Z was reconstituted into vesicles/proteoliposomes before being incorporated into the membrane selective layer. The molar ratio of AQP-Z to lipid was 1:400 for ABM_1 and ABM_2 respectively.

Entries PEI_500 and PEI_3200 refer to PEI membranes comprising a lipid-containing polyamide layer prepared according to the method described above, wherein PEI_500 is scaled up to a 2-inch module with 500 hollow fibers, and PEI_3200 is scaled to a 4-inch module with 3200 hollow fibers.

Notably, it is observed that both the ABMs and lipid-based membranes of the present invention exhibit comparable water permeability and salt rejection.

Since the substrates used for the fabrication of both membranes are identical (i.e., PEI), the thin film layer formed with the addition of lipids or AQPs may be inferred to provide similar performance in respect of permeability and solute rejection. However, one advantage of the lipid-containing membranes of the present invention is that the composite membrane is not dependent on the properties or quality of biomolecules. Instead, the permeability/rejection performance of the composite membrane described herein can be easily fine-tuned by, for instance, adjusting the concentration of lipids in the aqueous phase during synthesis. In contrast, the performance of AQP-based membranes is highly dependent on the biological character and purity of the protein being used.

TABLE 2

| Membrane | Area (cm$^2$) | Length (cm) | Water permeability, A$^a$ (LMH/bar) | NaCl rejection, R$^b$ at 2 bar (%) | NaCl rejection, R$^c$ at 5 bar (%) |
|---|---|---|---|---|---|
| PEI-DOPC | 26-300 | 20.7-39.8 | 8.5 ± 1.5 | 96 ± 1.5 | |
| PEI_500 (2-inch module) | 5000 | 39.8 | 6.9 ± 0.7 | 95.7 ± 1.0 | 96.8/97.6 |
| PEI_3200 (4-inch module) | 32000 | 39.8 | 6.3 ± 0.2 | 93.7 ± 1.6 | 96.0/97.0 |
| ABM_1 (2-inch module) | 5000 | 39.8 | 6.7 | 94.1 | |
| ABM_2 (4-inch module) | 32000 | 39.8 | 6.7 | 93.4 | |

For the above measurements, water permeability was tested at 2 bar applied pressure using ultrapure water. Sodium chloride rejection was tested using 500 mg/L NaCl solution at 2 bar applied pressure and also at 1000 mg/L NaCl solution at 5 bar applied pressure Industrial Testing The long term performance of the lipid based membranes was tested with real wastewater that was collected from one wastewater treatment plant in Singapore. It was the UF filtrate of a secondary effluent, which is also called NEWater RO feed. The total organic carbon (TOC) content of the feed water was about 7-8 mg/L. During the long term run, feed water was changed every 10-14 days. System flushing was carried out when feed water was changed, while chemical cleaning (with acid/base) was performed on monthly basis.

Figure 5A:
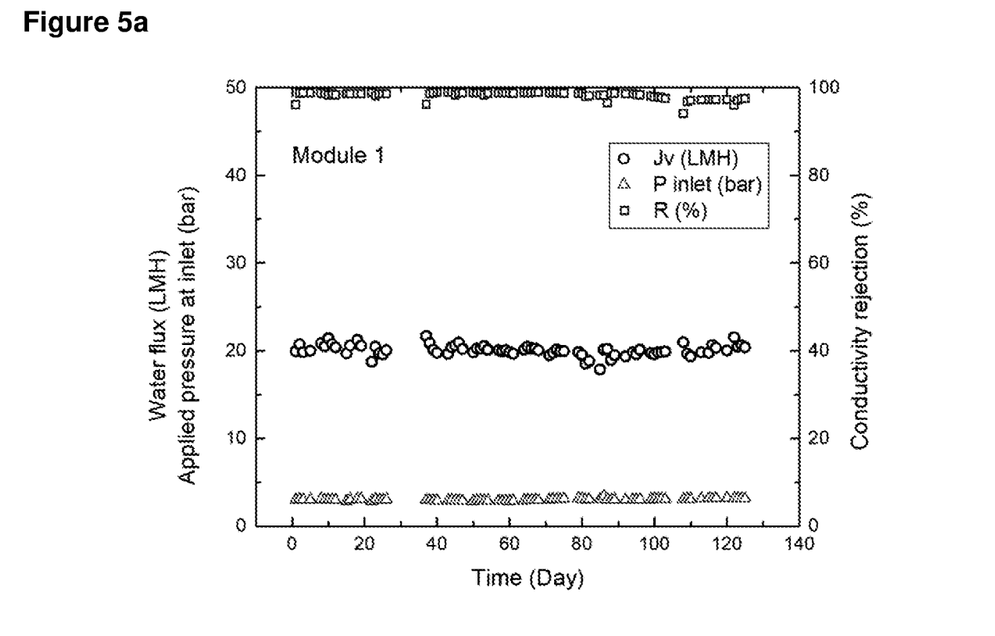
FIG. 5a is a graphical representation of the performance of membrane module 1 in filtering NEWater Reverse Osmosis feed water. Membrane module 1 is an exemplary membrane module comprising the composite membrane described herein, prepared with DOPC, having 300 $cm^2$ active membrane area. As depicted in the graph, Jv is a measure of the water flux (represented by ○), P inlet is the applied pressure at the inlet (represented by Δ), while R is the conductivity rejection (represented by □).
Figure 5B:
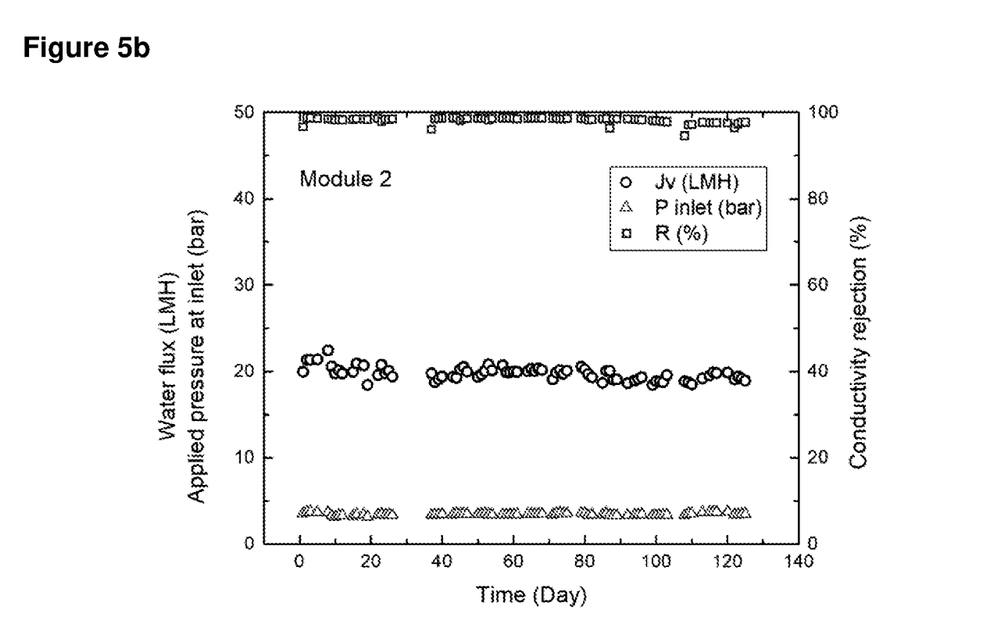
FIG. 5b is a graphical representation of the performance of a second membrane module (membrane module 2), in filtering NEWater Reverse Osmosis feed water. Membrane module 2 is an exemplary membrane module comprising the composite membrane described herein, prepared with DOPC, having 70 $cm^2$ active membrane area.

The flux and rejection performance of the membranes are shown in FIGS. 5a and 5b. During a 120-day operation, water flux was maintained at 20±1 LMH at an applied pressure of 2.9-3.5 bar. A freshly inserted or freshly cleaned membrane was able to achieve conductivity rejection of 96%, which increases to ~98% after one day operation. This may be due to the formation of a thin layer of foulants deposited on the membrane surface, which helps to seal the membrane micro-defects or to enhance the electrostatic interaction.

Each time after cleaning, the rejection returns to ~96%, indicating the effectiveness of cleaning. A TOC rejection of ~96.5±0.5% was maintained throughout the run.

Example 2

Polyetherimide (PEI) Hollow Fiber Substrates Coated with a Polyamide Selective Layer Comprising L-α-phosphatidylcholine (Egg PC)

The membrane preparation methods are the same as that used for example 1, except that the egg PC is used instead of DOPC.

The membrane performance of the egg PC-containing membrane is shown in Table 3. Similar to the DOPC based membranes, the addition of egg PC in MPD solution was found to increase membrane water permeability and salt rejection when compared to a control membrane that was prepared identically except that egg-PC was absent.

The water permeability of the membrane with egg PC addition can reach ~8 LMH/bar while the sodium chloride rejection is increased to ~94% at 2 bar applied pressure.

TABLE 3

| Membrane | Water permeability, A (LMH/bar) | NaCl rejection, R (%) | B/A (kPa) |
|---|---|---|---|
| PEI-egg PC | 8.1 ± 0.7 | 96 ± 1.5 | ~10 |
| PEI-control | 1.1 ± 0.2 | 90 ± 1.0 | 17 |

For the measurements in Table 3, 5 fibers were assembled in a half inch membrane module (membrane active area was around 26 cm$^2$). Water permeability was measured with ultrapure water, while salt rejection was measured with 500 mg/L NaCl feed solution. The applied pressure was 2 bar.

Example 3

PEI Hollow Fiber Substrates Coated with an Polyamide Layer Comprising 1,2-ditetradecanoyl-sn-glycero-3-phosphocholine (DMPC)

In this example, a phospholipid 1,2-ditetradecanoyl-sn-glycero-3-phosphocholine ("DMPC") was used for the membrane preparation. The synthesis method is the same as Examples 1 and 2, wherein a selective polyamide layer is formed on the lumen of a PEI hollow fiber substrate. The only difference was the change of lipid type.

Similarly, a control membrane was synthesized using the same protocol, except that DMPC is absent from the aqueous phase. Compared with the control membrane formed without the lipid, the DMPC-containing membrane demonstrates an increased water permeability of ~6.3 LMH/bar in contrast to the 1.1 LMH/bar of the control membrane. The NaCl rejection was also improved to ~95.5% from 90%. This is tabulated in Table 4 below. DMPC/PEI-1 and DMPC-PEI-2 are two replicates fabricated under the same conditions.

TABLE 4

| Membrane | Water Permeability, A (LMH/bar) | Rejection (%) |
|---|---|---|
| DMPC/PEI-1 | 6.37 | 95.8 |
| DMPC/PEI-2 | 6.26 | 95.2 |
| Control | 1.1 | 90 |

The membrane active area was approximately 30.6 cm$^2$ per module (5 fibers per module). Ultrapure water was used to measure the permeability (LMH/bar). A 500 mg/L NaCl feed was used for the salt rejection measurement. The applied pressure was 2 bar.

Example 4

Polyethersulfone (PES) Hollow Fiber Substrates Coated with Polyamide Layer Comprising Egg PC The membrane preparation procedure is similar to Example 2, except that a polyethersulfone (PES) porous membrane was used as the support layer.

PES hollow fiber substrates were fabricated based on the non-solvent induced phase separation (NIPS) method by a dry jet-wet spinning. The resultant fibers have inner/outer diameters of 780/1100 μm. The interfacial polymerization used for selective layer formation is identical as that described in example 2.

For assessing performance, two half-inch membrane modules, each having 5 PES fibers, were used. The membrane active area is around 26 cm$^2$ for both modules. One module contained PES fibers coated with a polyamide layer comprising egg PC, whereas the other module contained a control PES fibers (egg PC absent).

Water permeability was measured with ultrapure water, while salt rejection was measured with 500 mg/L NaCl feed solution. The applied pressure was 2 bar.

As shown in Table 5, the addition of egg PC to MPD solution was found to significantly enhance the water transport efficiency. The water permeability was increased to 4 LMH/bar for the egg PC based RO membrane with PES substrate, in contrast to the 0.8 LMH/bar where egg PC was absent.

Similar to the previous Examples, NaCl rejection improved from 92% to 96% when egg PC was present.

TABLE 5

| Membrane | Water permeability, A (LMH/bar) | NaCl rejection, R (%) | B/A (kPa) |
|---|---|---|---|
| PES-egg PC | 4.0 ± 0.2 | 96 ± 1.0 | ~6 |
| PES-control | 0.8 ± 0.15 | 92 ± 2.0 | 12.5 |

Example 5

Polyetherimide (PEI) Flat-Sheet Substrate with DOPC-Containing Polyamide Layer

The lipid based membrane of the present invention may be also provided in a flat-sheet configuration.

In the current example, a flat-sheet membrane substrate consisting of a PEI layer on top of a non-woven fabric was used. The dope solution consisting of PEI and NMP was poured on a non-woven fabric (supported by a glass plate) and a casting blade with 150 μm height was applied to make a thin film on the glass. The applied film was then quickly immersed into a tap water bath, where phase inversion takes place and a membrane substrate is formed.

The polyamide selective layer was then formed via interfacial polymerization using MPD and TMC. Similar to the previous examples, the DOPC was added to the MPD solution such that the aqueous mixture used for the interfacial polymerization reaction contains lipids.

Table 6 shows a comparison between the DOPC based membrane and the control membrane (without DOPC addition). It can be seen that the water permeability coefficient is increased by ~60%, while NaCl rejection also improved from 91.5% to 93.6% upon the lipid addition.

TABLE 6

| Membrane | Water permeability, A (LMH/bar) | NaCl Rejection, R (%) |
|---|---|---|
| PEI-DOPC (FS) | 1.66 ± 0.05 | 93.6 ± 0.9 |
| PEI-Control (FS) | 0.965 ± 0.12 | 91.5 ± 1.4 |

For the performance assessment, a 500 mg/L NaCl feed was used for salt rejection measurement. The applied pressure was 10 bar.

The membrane filtration cell has an active membrane area of around 42 cm$^2$ (Sterlitech CF042 membrane cell).

Standard deviation is based on the results of at least two independent samples.

Example 6

Nanofiltration (NF) Membrane Comprising PEI Hollow Fiber Substrates Coated with DOPC-Containing Polyamide Layer In this example, PEI hollow fibers were used as the membrane substrate.

To fabricate DOPC-based NF membrane (PEI-DOPC-NF), the lumen surface of the substrate was contacted first with a piperazine (PIP) solution containing DOPC for 30 min.

Excess PIP solution was rinsed off the lumen surface by pumping fresh cyclohexane through the hollow fibers.

Finally, a cyclohexane solution containing TMC was pumped through the inner lumen surface to react with the PIP residue to form an NF rejection layer.

As control, a NF membrane without DOPC was also prepared and named as PEI-control-NF.

The performance of these NF membranes are shown in Table 7. Two commercially available NF membranes are also listed for comparison. GE-Osmonics HL is a commercially available NF membrane provided by GE, and NTR-7450 NF membrane was supplied by Nitto Denko.

The PEI-control-NF membrane (without lipid) exhibited a water permeability of 15 LMH/bar, but had a low rejection rate of 80.2% towards $MgSO_4$. In comparison, the membrane according to the present invention ("PEI-DOPC-NF") showed slightly superior water permeability (at 15.5 LMH/bar) and demonstrated significantly better salt rejection (93.3% based on $MgSO_4$).

It is further notable that both NF membranes (control and DOPC-containing) outperformed the commercially available membranes in terms of balancing water permeability with solute rejection, and were able to do so at substantially lower operating pressures.

TABLE 7

Performance of DOPC based NF membrane.

| Membrane | Water permeability (LMH/bar)$^a$ | $MgSO_4$ rejection (%)$^b$ | Operating pressure (bar) |
|---|---|---|---|
| PEI-DOPC-NF $^{c, d}$ | 15.5 | 93.3 | 2 |
| PEI-control-NF $^c$ | 15 | 80.2 | 2 |
| GE-Osmonics HL | 6.7 | 97 | 7.6 |
| Nitto-Denko NTR-7450 | 10.9 | 48 | 10 |

$^a$For the above results, water permeability was measured with ultrapure water at 2 bar applied pressure for the NF membranes.
$^b$For testing salt rejection, a 1000 mg/L $MgSO_4$ feed solution was used for measuring salt rejection for all four membranes.
$^c$ The membrane active area was around 30.6 cm$^2$ (5 fibers) for PEI-DOPC-NF and PEI-control-NF, and 42 cm$^2$ for GE-Osmonics HL.
$^d$ It is estimated that if a similar operating pressure of 7.6 bar or higher was used for the DOPC-PEI-NF membrane, the membrane rejection towards $MgSO_4$ would be 98.5% or greater.

Example 7

Osmotically Driven (OD) Membrane Based on PEI Hollow Fiber Substrate Coated with a DOPC-Containing Polyamide Layer A porous PEI substrate was developed to fabricate lipid based osmotically driven (OD) membranes. This substrate has less dense structure compared with RO/NF membrane substrates. The preparation of the rejection layer is similar to that described in Example 1. A control membrane (without lipid) and the lipid based membrane are named as OD membrane and DOPC-OD membrane, respectively.

A comparison of the two membranes is presented in Table 8. It can be seen that the addition of DOPC resulted in a more permeable selective layer (~5.8 LMH/bar for DOPC-OD membrane vs. 4.1 LMH/bar for OD membrane).

When the membranes are run in forward osmosis (FO) mode (active-layer-facing-feed-solution, AL-FS orientation), the water fluxes are 30 LMH and 25 LMH, i.e., the addition of DOPC led to a 20% water flux increase. In pressure retarded osmosis (PRO) test (active-layer-facing-draw-solution, AL-DS orientation) with 12.5 bar applied pressure at draw solution side, about 8% increase in power density (W/m$^2$) can be gained for the DOPC based OD membrane.

TABLE 8

Performance of DOPC based osmotically driven membrane.

| Membrane | RO test Water permeability (L/m$^2$ · hr · bar) | NaCl rejection (%) | FO test Water flux, Jw (L/m$^2$ · hr) | PRO test Water flux, Jw (L/m$^2$ · hr) | Power density (W/m$^2$) |
|---|---|---|---|---|---|
| OD membrane | 4.1 | 95.2 | ~25 | 42.3 | 14.7 |
| DOPC-OD membrane | 5.79 | 93.2 | ~30 | 45.8 | 15.9 |

For the above testing, the OD membrane and the DOPC-OD membrane were respectively constituted into a membrane module consisting of 15 fibers each. Each module possesses an effective membrane area of around 40.6 cm$^2$ (inner and outer diameters of the fiber are 392 μm and 605 μm, respectively).

For the RO testing, a 500 mg/L NaCl feed solution, supplied at a 200 ml/min crossflow rate, was used. The applied pressure was 2 bar.

For the FO testing, an ultrapure feed water was circulated at 100 ml/min (lumen), and 1 M NaCl draw solution was circulated at 1000 ml/min (shell).

For the PRO testing, ultrapure feed water was circulated at 1000 ml/min (shell), and 1 M NaCl draw solution was circulated at 100 ml/min (lumen). The applied pressure at draw solution side was 12.5 bar.

INDUSTRIAL APPLICABILITY

The method for preparing a composite membrane as described herein may be used for industrial production and assembly of membrane modules which may be used in water filtration systems. The absence of transmembrane proteins in the preparation of composite membranes disclosed herein allows for better quality control to be achieved during industrial fabrication of the composite membranes.

The composite membranes obtained from the methods described herein may be used for the as nanofiltration and osmotically driven membranes in water filtration and purification systems.

Thus, it can be seen that the composite membrane and methods of making thereof in accordance with the present embodiments have the advantages of providing a composite membrane having a high water permeability while maintaining low solute passage. While exemplary embodiments have been presented in the foregoing detailed description of the invention, it should be appreciated that a vast number of variations exist.

It should further be appreciated that the exemplary embodiments are only examples, and are not intended to limit the scope, applicability, operation, or configuration of the invention in any way. Rather, the foregoing detailed description will provide those skilled in the art with a convenient road map for implementing an exemplary embodiment of the invention, it being understood that various changes may be made in the function and arrangement of elements and method of operation described in an exemplary embodiment without departing from the scope of the invention as set forth in the appended claims.

The invention claimed is:
1. A composite membrane comprising:
a) at least one porous membrane substrate having nano-sized or micro-sized pores, and b) at least a polyamide layer disposed on a surface of the porous membrane substrate, the polyamide layer comprising at least one phospholipid dispersed therein, and wherein the polyamide layer is an interfacial polymerization product;

wherein the polyamide layer does not comprise aquaporins; and wherein the polyamide layer is a fully aromatic polyamide layer comprising leaf-like features with an apparent height of between 200 nm to 4,000 nm.

2. The composite membrane of claim 1, wherein the polyamide layer is formed via interfacial polymerization which comprises first impregnating the surface of the porous membrane substrate with an aqueous phase comprising at least one polyamine and the phospholipid;

rinsing the surface of the impregnated porous membrane substrate with an organic solvent; and contacting the impregnated porous membrane with an organic phase containing a monomer comprising at least one crosslinking group to thereby result in the formation of the polyamide layer.

3. The composite membrane of claim 1, wherein the phospholipid is provided in a molar concentration of from about 10 μM to about 10 mM in the aqueous phase; preferably from about 50 μM to about 4 mM.

4. The composite membrane of claim 1, wherein the phospholipid has a formula (I):

(Formula I)

wherein $R_1$ represents a saturated or an unsaturated aliphatic group having 14 to 24 carbon atoms; and wherein $R_2$ represents a saturated or an unsaturated aliphatic group having 14 to 24 carbon atoms; and wherein $R_3$ is:

5. The composite membrane of claim 2, wherein the polyamine comprises at least two amine groups, wherein said amine groups are independently primary amine or secondary amine groups.

6. The composite membrane of claim 2, wherein the organic phase comprises the monomer comprising at least one crosslinking group in a concentration of from about 0.00001 wt. % to about 2 wt. %; preferably from about 0.001 wt. % to 1 wt. %.

7. The composite membrane of claim 1, wherein the porous membrane substrate comprises polyethersulfone, polyetherimide, polysulfone, polyacrylonitrile, polyimide, polyvinylidene fluoride, polypropylene, poly(tetrafluoroethylene), or co-polymers thereof.

8. The composite membrane of claim 1, wherein the polyamide layer does not comprise a transmembrane protein or analogues thereof.

9. A hollow fiber membrane or a flat-sheet membrane comprising the composite membrane of claim 1.

10. The composite membrane of claim 4, wherein the phospholipid is selected from the group consisting of: 1,2-dioleoyl-sn-glycero-3-phosphocholine (DOPC), 1,2-dioleoyl-sn-glycero-3-phosphoethanolamine (DOPE), 1,2-dioleoyl-sn-glycero-3-phospho-rac-(1-glycerol) (DOPG), L-α-phosphatidylcholine (egg PC), 1,2-ditetradecanoyl-sn-glycero-3-phosphocholine (DMPC), 2-oleoyl-1-palmitoyl-sn-glycero-3-phosphocholine (POPC), 1,2-dilauroyl-sn-glycero-3-phosphocholine (DLPC), 1,2-dimyristoyl-sn-glycero-3-phosphocholine (DMPC), 1,2-dipalmitoyl-sn-glycero-3-phosphocholine (DPPC), 1,2-distearoyl-sn-glycero-3-phosphocholine (DSPC), 1,2-dilauroyl-sn-glycero-3-phospho-(1'-rac-glycerol) (sodium salt) (DLPG), 1,2-dimyristoyl-sn-glycero-3-phospho-(1'-rac-glycerol) (sodium salt) (DMPG), 1,2-dipalmitoyl-sn-glycero-3-phospho-(1'-rac-glycerol) (sodium salt) (DPPG), 1-palmitoyl-2-oleoyl-sn-glycero-3-phospho-(1'-rac-glycerol) (sodium salt) (POPG), 1,2-dimyristoyl-sn-glycero-3-phospho-L-serine (sodium salt) (DMPS), 1,2-dipalmitoyl-sn-glycero-3-phospho-L-serine (sodium salt) (DPPS), 1,2-distearoyl-sn-glycero-3-phospho-L-serine (sodium salt) (DSPS), 1,2-dioleoyl-sn-glycero-3-phospho-L-serine (sodium salt) (DOPS), 1-palmitoyl-2-oleoyl-sn-glycero-3-phospho-L-serine (sodium salt) (POPS), 1,2-dilauroyl-sn-glycero-3-phosphate (sodium salt) (DLPA), 1,2-dimyristoyl-sn-glycero-3-phosphate (sodium salt) (DMPA), 1,2-dipalmitoyl-sn-glycero-3-phosphate (sodium salt) (DPPA), 1,2-distearoyl-sn-glycero-3-phosphate (sodium salt) (DSPA), 1-palmitoyl-2-oleoyl-sn-glycero-3-phosphate (sodium salt) (POPA), 1,2-dilauroyl-sn-glycero-3-phosphoethanolamine (DLPE), 1,2-dimyristoyl-sn-glycero-3-phosphoethanolamine (DMPE), 1,2-dipalmitoyl-sn-glycero-3-phosphoethanolamine (DPPE), 1,2-distearoyl-sn-glycero-3-phosphoethanolamine (DSPE), 1-palmitoyl-2-oleoyl-sn-glycero-3-phosphoethanolamine (POPE), E. coli lipid extract, soy lipid extract, yeast lipid extract, 1-palmitoyl-2-(dipyrrometheneboron difluoride) undecanoyl-sn-glycero-3-phosphocholine, 1,2-dioleoyl-sn-glycero-3-phospho-(1'-myo-inositol) (ammonium salt) (DOPI), 1-palmitoyl-2-oleoyl-sn-glycero-3-phosphoinositol (ammonium salt) (POPI), 1,2-dipalmitoyl-sn-glycero-3-phospho-(1'-myo-inositol) (ammonium salt) (DPPI), 1,1', 2,2'-tetraoleoyl cardiolipin (TOCL), 1,2-dioleoyl-sn-glycero-3-phosphoethanol (DOPEt), 1,2-dioleoyl-sn-glycero-3-phosphoethanol (DOPEt) (18:0 diethyl PC), or combinations thereof; or wherein the phospholipid is selected from the group consisting of: 1,2-Dioleoyl-sn-glycero-3-phosphocholine (DOPC), 1,2-Dioleoyl-sn-glycero-3-phosphoethanolamine (DOPE), 1,2-Dioleoyl-snglycero-3-phospho-rac-(1-glycerol) (DOPG), L-α-phosphatidylcholine (egg PC), 1,2-ditetradecanoyl-sn-glycero-3-phosphocholine (DMPC), 2-Oleoyl-1-palmitoyl-sn-glycero-3-phosphocholine (POPC), and mixtures thereof.

11. The composite membrane of claim 5, wherein the polyamine is selected from the group consisting of: m-phenylenediamine (MPD), m-phenylenediamine-4-methyl, 1,3-cyclohexanebis(methylamine), o-phenylenediamine (OPD), piperazine, p-phenylenediamine (PPD), 1,1'-biphenyl-4,4'-diamine (benzidine), polyethyleneimine, and mixtures thereof.

12. The composite membrane of claim 2, wherein the monomer comprising at least one crosslinking group is selected from the group consisting of trimesoyl chloride (1,3,5-benzenetricarbonyl trichloride), terephthalic acid chloride, isophthalic acid chloride, biphenyl dicarboxylic acid chloride, naphthalene dicarboxylic acid dichloride, biphenyl-4,4'-disulfonyl chloride, 1,3,6-naphthalenetrisulfonyl chloride, and mixtures thereof.

13. The composite membrane of claim 2, wherein the organic phase further comprises an organic solvent which is unreactive with the monomer comprising at least one crosslinking group.

* * * * *